J. H. McCORMICK.
DRAW GEAR AND BUFFING APPARATUS.
APPLICATION FILED JUNE 8, 1908.

1,076,686.

Patented Oct. 28, 1913.

Witnesses
Carl Stoughton
A. L. Phelps

Inventor
John H. McCormick
C. C. Shepherd
Attorney

UNITED STATES PATENT OFFICE.

JOHN H. McCORMICK, OF COLUMBUS, OHIO.

DRAW-GEAR AND BUFFING APPARATUS.

1,076,686.

Specification of Letters Patent.

Patented Oct. 28, 1913.

Application filed June 8, 1908. Serial No. 437,307.

*To all whom it may concern:*

Be it known that I, JOHN H. McCORMICK, a citizen of the United States, residing at Columbus, in the county of Franklin and State of Ohio, have invented certain new and useful Improvements in Draw-Gear and Buffing Apparatus, of which the following is a specification.

My invention relates to the improvement of that class of draw gear and buffing apparatus in which friction resistance is employed in connection with a resisting spring to reduce shocks and prevent rebound that result from cars meeting in violent contact with each other, and my invention has particular relation to the improvement of that type of draw gear and buffing apparatus which is shown in my former Patent #719,949 of February 3rd, 1903.

The object of my present invention is to provide an improved construction and arrangement of friction elements and means for effectively absorbing shocks; to provide an improved construction whereby the movable parts of my device are retained in proper alinement regardless of the inequalities in construction of the car or of the lateral or swinging movement of the car and to provide other improvements the details of which will be more fully pointed out hereinafter.

Figure 1:
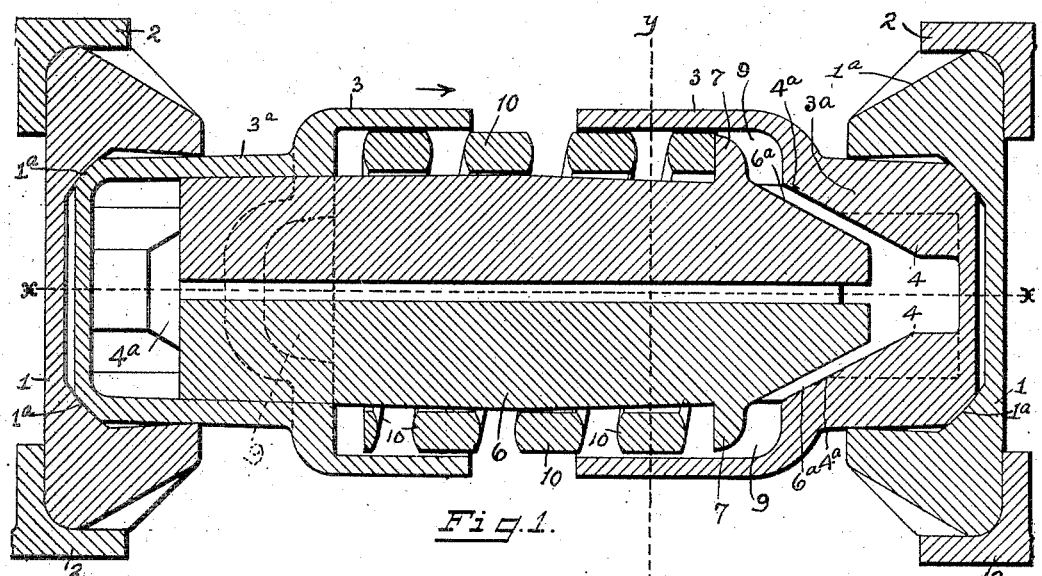
Figure 2:
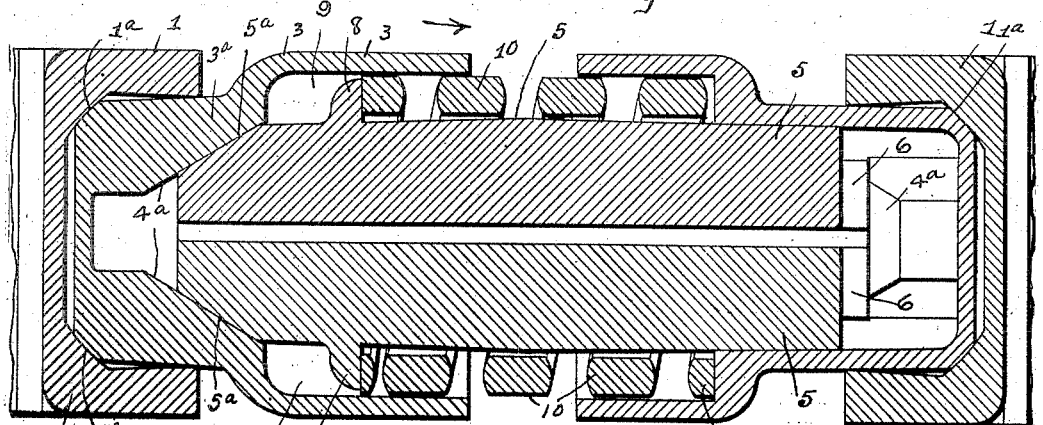
Figure 3:
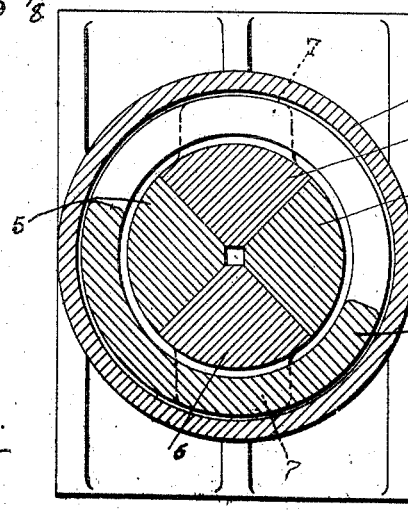

These objects I accomplish in the manner illustrated in the accompanying drawing, in which:

Figure 1 is a central longitudinal section of my improved buffing apparatus, Fig. 2 is a sectional view on line x—x of Fig. 1, and, Fig. 3 is a transverse section on line y—y of Fig. 1.

Similar numerals refer to similar parts throughout the several views.

In carrying out my invention I employ opposing external or outer end follower bodies 1, the central and inner side socket or depression of each of which has its inner corner portion formed with a slightly rounded bevel, as shown at 1ᵃ. The followers 1 are engaged by suitable fixed carriers 2 of the car.

3 represent opposing wedging devices, each of which is in the nature of a substantially cup-shaped body, the outer portion of which is of reduced diameter as indicated at 3ᵃ. The reduced portions of the wedging bodies 3 are contained in the recesses of the external followers 1, the ends of said reduced portions being formed with rounded corners which are adapted to contact with the rounded surfaces 1ᵃ of the follower recesses.

As indicated in the drawing each of the wedging bodies 3 is of a substantially cup-shape, the inner reduced portion thereof being formed with two inwardly projecting oppositely located wings 4, the outer faces of which are inclined as indicated at 4ᵃ to form wedging surfaces. It will be noted that the wedging wings 4 of one of the bodies 3 occupy positions at right angles with those in the remaining or opposing wedging body. Within the wedging cups or bodies 3, I provide four friction segments, two of which are indicated at 5 and the remaining two of which are indicated at 6. These segments are in the nature of elongated half-round bodies, which when fitted together, form a substantially round body, as shown more clearly in Fig. 3 of the drawing.

The upper and lower friction segments 6 are formed at one end with inclined wedging faces 6ᵃ, while the opposite ends of the segments 5 are similarly inclined, the inclined portions being indicated in Fig. 2 of the drawing at 5ᵃ. Each of the segments 6 has projecting therefrom adjacent to its wedging end a lug 7 and each of the segments 5 is likewise provided near its wedging end with a projecting lug 8, these lugs extending within pockets or within said recesses 9 of the wedging bodies 3. Between the lugs 7 and lugs 8 is interposed a coiled spring 10, the latter surrounding the friction segments, as shown, and having its end portions contained within the enlarged outer end portions of the wedging cups 3.

In the construction of the reduced portions 3ᵃ of the wedging bodies 3, the inner surfaces thereof which are not occupied by the wings 4 are tapered slightly toward the inner end of the body and the outer surfaces of the friction segments are correspondingly tapered toward their outer end portions forming friction faces that are at the same time wedging faces.

Assuming that the shock imparted is in the direction of the arrow in Figs. 1 and 2 of the drawing, it will be understood that the pressure of the external follower 1 at the left, against the wedging body 3 with which the corresponding ends of the friction segments 5 are in engagement, will result in a horizontal movement of said segments 5 which through the lugs 8 will cause a compression of the spring 10 against the opposite wedging body 3 and in a corresponding movement of the members 6 until the latter contact with the beveled surfaces 4ª. In this connection it will be noted that a space normally exists between the bevels 4ª and 6ª, thus permitting of a preliminary spring movement without friction between the members 5 and 6. The compression of the spring will be followed by the wedging engagement of the inclined surfaces 6ª of the segments 6 and the inclined surfaces 4ª of the wedging wings 4 at the corresponding end of the apparatus. In addition to the wedging action described, it will be readily understood that an increased frictional engagement of parts will be attained through the engagement of the inclined inner surfaces of the wedging cups 3 and inclined external surfaces of the friction segments. It is also obvious that the frictional engagement of the various elements or parts heretofore mentioned, must result in a frictional engagement of the friction segments 5 and 6 with each other and that the engagement described of the various friction and wedging parts, in conjunction with the spring 10, will serve to absorb the shock or jar resulting from the impact or sudden contact of two cars or heavy bodies. It will be readily understood that when the jar is imparted in the opposite direction from that described, similar engagements of the various parts of my device will occur in the reverse manner.

Owing to the fact that the bearing ends of the wedging bodies 3 are provided with rounded corner portions which bear against the rounded surfaces 1ª of the recesses of the followers 1, it will be seen that lateral or swinging movement of the followers which may be due to the movement of the cars about curves or may be due to irregularities in the parts of the cars with which the carriers are connected, will not affect the horizontal movement of the wedging bodies and the equal distribution of the pressures on all the parts of my device.

In the specification and claims, I have for the sake of convenience used the term "wedging faces" and "wedging friction faces" one in contradistinction to the other. By the term "wedging faces," I mean the acutely tapered faces 4ª against which bear the corresponding acutely tapered ends 5ª and 6ª. By "wedging friction faces" I mean the inner faces of the reduced portions 3ª of the wedging bodies 3 which are tapered but slightly, so that the correspondingly slightly tapered ends of the friction segments will travel or move therein to the full movement of the gear, while the opposing or acutely tapered ends 5ª and 6ª will not only jam or wedge immediately against the adjacent surfaces 4ª, but will be slightly displaced which permits the entering and effective operation of the "wedging friction faces" their full movement, owing to the very slight taper of the portions 3ª.

What I claim, is:

1. In a friction draft and buffing apparatus, the combination with the friction elements, of a spring inclosing the friction elements and having only end contact with said friction elements, and means for pressing the contacting friction elements in opposite directions and against each other.

2. In a friction draft and buffing apparatus, the combination with opposite wedging devices that limit the closing movement of each other by direct contact with each other, of a plurality of intermediate friction elements engaging said wedging devices at each end, and a spring resisting the movement of the contacting friction elements from opposite directions.

3. In a friction draft and buffing apparatus, the combination with opposite wedging devices, of a plurality of intermediate friction elements that normally contact with the wedging faces of one wedging device only, and a spring contacting directly with the other wedging device and all the friction elements.

4. In a friction draft and buffing apparatus, the combination with a plurality of friction elements, of means for wedging the friction elements against each other, and of followers having pivotal engagement with the wedging means.

5. In a friction draft and buffing apparatus, the combination with a plurality of friction elements, of means for pressing the friction elements against each other, and a pivotal follower.

In testimony whereof I affix my signature in presence of two witnesses.

JOHN H. McCORMICK.

Witnesses:
A. L. PHELPS,
L. CARL STOUGHTON.

Copies of this patent may be obtained for five cents each, by addressing the "Commissioner of Patents, Washington, D. C."